(12) United States Patent
Jia et al.

(10) Patent No.: US 12,276,376 B1
(45) Date of Patent: Apr. 15, 2025

(54) BRACKET ASSEMBLY AND METHOD FOR MOUNTING A LOUDSPEAKER

(71) Applicant: Harman International Industries, Incorporated, Stamford, CT (US)

(72) Inventors: Yanyang Jia, Guangdong (CN); Richard D. Kamlet, Valencia, CA (US); Kaiquan Wang, Guangdong Province (CN)

(73) Assignee: Harman International Industries, Incorporated, Stamford, CT (US)

( * ) Notice: Subject to any disclaimer, the term of this patent is extended or adjusted under 35 U.S.C. 154(b) by 61 days.

(21) Appl. No.: 18/496,309

(22) Filed: Oct. 27, 2023

(51) Int. Cl.
*F16M 13/02* (2006.01)

(52) U.S. Cl.
CPC ................................. *F16M 13/022* (2013.01)

(58) Field of Classification Search
CPC ....... F16M 13/00; F16M 13/02; F16M 13/022
See application file for complete search history.

(56) References Cited

U.S. PATENT DOCUMENTS

| | | | | |
|---|---|---|---|---|
| 2,500,048 A | * | 3/1950 | Stoiber | F16M 11/2021 248/184.1 |
| 4,318,522 A | * | 3/1982 | Appleberry | F16C 11/00 248/661 |
| 4,470,106 A | * | 9/1984 | Norton | F21V 21/0965 362/426 |
| 4,928,914 A | * | 5/1990 | Snodell | F16M 13/027 248/323 |
| 5,201,896 A | * | 4/1993 | Kruszewski | F16M 11/10 248/278.1 |
| 5,664,752 A | * | 9/1997 | Matthiessen | F16M 11/2021 248/299.1 |
| 5,730,409 A | * | 3/1998 | Baron | H04R 1/026 248/292.12 |
| D395,892 S | * | 7/1998 | Solomon | D14/224 |
| 6,264,152 B1 | * | 7/2001 | Bloch | F16M 11/126 343/882 |
| 6,347,776 B1 | * | 2/2002 | Chuang | F16M 13/02 403/114 |
| 6,467,745 B1 | * | 10/2002 | Sickels | H04R 1/026 248/242 |
| 6,505,988 B1 | * | 1/2003 | Oddsen, Jr. | F16M 11/105 248/278.1 |

(Continued)

*Primary Examiner* — Monica E Millner
(74) *Attorney, Agent, or Firm* — Brooks Kushman P.C.

(57) ABSTRACT

A bracket assembly for mounting a loudspeaker to a support surface includes a generally L-shaped wall bracket including an adjustment plate including a slot and a mounting flange mountable to the support surface. The bracket assembly includes a generally U-shaped speaker bracket including a central plate mountable to the loudspeaker, a top arm, and a bottom arm. The bracket assembly includes a generally U-shaped intermediate bracket having a joining plate including a first aperture, an upper flange, and a lower flange. The intermediate bracket is coupled to the speaker bracket and rotatable about an axis defined between the top arm and the bottom arm for providing pan adjustability of the loudspeaker. The wall bracket is connectable to the intermediate bracket via a first fastener received through the slot and the first aperture, a position of the first fastener movable along the slot for providing tilt adjustability of the loudspeaker.

20 Claims, 9 Drawing Sheets

(56) References Cited

U.S. PATENT DOCUMENTS

| | | | | |
|---|---|---|---|---|
| 7,100,879 B2* | 9/2006 | Podue | ............ | H04R 1/026 |
| | | | | 439/948 |
| 7,455,271 B2* | 11/2008 | Pincek | ............ | F16M 13/02 |
| | | | | 248/220.21 |
| 7,513,474 B2* | 4/2009 | Anderson | ............ | F16M 11/10 |
| | | | | 248/922 |
| 8,675,906 B2* | 3/2014 | Lau | ............ | H04R 1/026 |
| | | | | 381/388 |
| 9,016,645 B2* | 4/2015 | Simpson | ............ | H04R 1/026 |
| | | | | 248/292.12 |
| 9,591,397 B2 | 3/2017 | Sprinkle | | |
| 9,942,639 B2* | 4/2018 | Wright | ............ | F16M 11/2021 |
| 9,982,832 B1* | 5/2018 | Nicolas | ............ | F16M 11/2014 |
| 10,010,177 B1* | 7/2018 | Pei | ............ | F16M 13/02 |
| 10,221,601 B2* | 3/2019 | Eichelberger | ............ | E05D 5/121 |
| 10,419,836 B2* | 9/2019 | Claerbout | ............ | G06F 3/165 |
| 10,555,059 B2* | 2/2020 | Nicolas | ............ | F16C 11/106 |
| 11,495,269 B2* | 11/2022 | Morrison | ............ | H04R 1/026 |
| 11,856,347 B1* | 12/2023 | Roberts | ............ | F16M 11/2014 |
| 2014/0151516 A1* | 6/2014 | Liu | ............ | H04R 1/026 |
| | | | | 248/124.1 |
| 2017/0289662 A1* | 10/2017 | Hannath | ............ | F16M 13/02 |
| 2022/0403976 A1* | 12/2022 | Morrison | ............ | F16M 13/027 |

\* cited by examiner

BRACKET ASSEMBLY AND METHOD FOR MOUNTING A LOUDSPEAKER

TECHNICAL FIELD

Embodiments relate to a bracket assembly and method for mounting a loudspeaker to a support surface.

BACKGROUND

It may be desirable for loudspeakers to be mounted to a wall or other vertical support surface in order to free up floor space and reduce sound interference, thereby improving acoustic experience for the user as well as loudspeaker performance. Such wall installations are increasingly utilized in commercial as well as residential settings, and the loudspeaker is typically mounted to the wall with one or more brackets. However, it can be challenging to mount loudspeakers in such a manner, as two people are typically needed to assemble the brackets: one person to hold the loudspeaker while the other person inserts and adjusts the screws. Adjusting the directivity of the loudspeaker in tilt and pan directions can also be difficult after the loudspeaker is mounted.

SUMMARY

In one or more embodiments, a bracket assembly for mounting a loudspeaker to a support surface includes a generally L-shaped wall bracket including an adjustment plate and a mounting flange, the mounting flange mountable to the support surface, the adjustment plate including a slot. The bracket assembly also includes a generally U-shaped speaker bracket including a central plate mountable to the loudspeaker, a top arm, and a bottom arm. The bracket assembly further includes a generally U-shaped intermediate bracket having a joining plate including a first aperture, an upper flange, and a lower flange. The intermediate bracket is coupled to the speaker bracket and rotatable about an axis defined between the top arm and the bottom arm for providing pan adjustability of the loudspeaker, and the wall bracket is connectable to the intermediate bracket via a first fastener received through the slot and the first aperture, wherein a position of the first fastener is movable along the slot for providing tilt adjustability of the loudspeaker.

In one or more embodiments, the first fastener is configured to fix a tilt position of the loudspeaker.

In one or more embodiments, the slot is oriented generally parallel to a horizontal axis of the wall bracket.

In one or more embodiments, a length of the slot corresponds to the tilt adjustability of the loudspeaker ranging between tilt angles of about 0° to −10°.

In one or more embodiments, the wall bracket further comprises a cutout disposed below the slot, and the intermediate bracket includes a second aperture below the first aperture, wherein the cutout and the second aperture are configured to receive a second fastener to support the loudspeaker during adjustment of the position of the first fastener along the slot.

In one or more embodiments, the top arm includes a top aperture, the bottom arm includes a bottom aperture, the upper flange includes an upper aperture, and the lower flange includes a lower aperture, wherein a top fastener is configured to be received through the top aperture and the upper aperture, and a bottom fastener is configured to be received through the bottom aperture and the lower aperture, the top fastener and bottom fastener configured to fix a pan position of the loudspeaker.

In one or more embodiments, the intermediate bracket includes fixed screw bolts formed in a rear surface thereof and aligned with the upper aperture, the lower aperture, the first aperture, and the second aperture for receiving the top fastener, the bottom fastener, the first fastener, and the second fastener, respectively.

In one or more embodiments, the bracket assembly further includes a cover having a longitudinal slot, the longitudinal slot configured to receive the adjustment plate of the wall bracket, the cover configured to conceal the mounting flange of the wall bracket.

In one or more embodiments, a bracket assembly for mounting a loudspeaker to a support surface includes a wall bracket including an adjustment plate and a mounting flange generally orthogonal to the adjustment plate, the mounting flange including at least one aperture configured to receive a fastener for mounting the wall bracket to the support surface, the adjustment plate having a horizontal axis and including a slot oriented generally parallel to the horizontal axis, the adjustment plate including a cutout oriented diagonally with respect to the horizontal axis. The bracket assembly also includes a speaker bracket including a central plate having at least one aperture configured to receive a fastener for mounting the speaker bracket to the loudspeaker, a top arm generally orthogonal to the central plate and having a top aperture, and a bottom arm generally orthogonal to the central plate and having a bottom aperture. The bracket assembly further includes an intermediate bracket having a joining plate including a first aperture and a second aperture, an upper flange generally orthogonal to the joining plate and including an upper aperture, and a lower flange generally orthogonal to the joining plate and including a lower aperture. The intermediate bracket is coupled to the speaker bracket and rotatable about an axis defined between the top aperture and the bottom aperture for providing pan adjustability of the loudspeaker, and the wall bracket is connectable to the intermediate bracket via a first fastener received through the slot and the first aperture and via a second fastener received through the cutout and the second aperture, wherein a position of the first fastener is movable along the slot for providing tilt adjustability of the loudspeaker.

In one or more embodiments, a method for mounting a loudspeaker to a support surface includes providing a generally L-shaped wall bracket including an adjustment plate and a mounting flange, the adjustment plate including a slot. The method also includes providing a generally U-shaped speaker bracket including a central plate, a top arm, and a bottom arm. The method further includes providing a generally U-shaped intermediate bracket having a joining plate including a first aperture, an upper flange, and a lower flange, the intermediate bracket rotatably coupled to the speaker bracket. Still further, the method includes mounting the mounting flange of the wall bracket to the support surface, mounting the central plate of the speaker bracket to the loudspeaker, receiving a first fastener through the slot of the wall bracket and the first aperture of the intermediate bracket to connect the wall bracket to the intermediate bracket, adjusting a relative position between the intermediate bracket and the speaker bracket to provide pan adjustability of the loudspeaker, and adjusting a position of the first fastener along the slot to provide tilt adjustability of the loudspeaker.

In one or more embodiments, the method includes securing the first fastener in the slot to fix a tilt position of the loudspeaker.

In one or more embodiments, the wall bracket further comprises a cutout disposed below the slot, and the intermediate bracket includes a second aperture below the first aperture, and the method further includes receiving a second fastener through the cutout and the second aperture to support the loudspeaker during adjustment of the position of the first fastener along the slot.

In one or more embodiments, the top arm includes a top aperture, the bottom arm includes a bottom aperture, the upper flange includes an upper aperture, and the lower flange includes a lower aperture, and the method further includes receiving a top fastener through the top aperture and the upper aperture and receiving a bottom fastener through the bottom aperture and the lower aperture, and securing the top fastener and bottom fastener to fix a pan position of the loudspeaker.

In one or more embodiments, the method includes providing a cover having a longitudinal slot, receiving the adjustment plate of the wall bracket through the longitudinal slot, and concealing the mounting flange of the wall bracket with the cover.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1-13, a bracket assembly 100 is disclosed herein which is configured to mount a loudspeaker 102 to a wall or other support surface 104, allowing for adjustment of the position of the loudspeaker 102 relative to two axes during and after installation. More specifically, the bracket assembly 100 provides both tilt and pan adjustment capabilities of the loudspeaker 102, thus providing the capability to adjust the directivity of acoustical output from the loudspeaker 102. Advantageously, the bracket assembly 100 enables a single person to complete the task of mounting the loudspeaker 102 to the support surface 104 and making any desired tilt and/or pan adjustments.

The support surface 104 may be any structure suitable for receiving the bracket assembly 100 and its associated loudspeaker 102. For example, the support surface 104 may be a wall, a ceiling, a speaker cabinet, a panel, or others. The bracket assembly 100 in combination with the loudspeaker 102 may collectively be considered to be a loudspeaker assembly 106.

With reference first to FIGS. 1-4 and 12-13, in one or more embodiments the bracket assembly 100 includes a wall bracket 108 including an adjustment plate 110 and a mounting flange 112 generally orthogonal to the adjustment plate 110, such that the wall bracket 108 may be generally L-shaped. The mounting flange 112 is mountable to the support surface 104 and includes at least one aperture 114 (typically two spaced apertures 114) each configured to receive a fastener (e.g. screws, not shown) for mounting the wall bracket 108 to the support surface 104. The adjustment plate 110 has a horizontal axis 116 (FIG. 1) and includes a slot 118 which may be oriented generally parallel to the horizontal axis 116, wherein the horizontal axis 116 may be generally orthogonal to a plane of the support surface 104 when the wall bracket 108 is mounted. The slot 118 may be generally pill-shaped and is configured to receive a first fastener 120 (e.g. screw). The slot 118 facilitates easy installation as well as adjustment of the tilt angle of the loudspeaker 102 (e.g. 0° to −10°) after installation as described further below.

As best shown in FIGS. 1-4 and 10-13, in one or more embodiments the adjustment plate 110 further includes a cutout 122 which may be oriented diagonally with respect to the horizontal axis 116, wherein the cutout 122 may be disposed generally below and spaced from the slot 118. More particularly, the cutout 122 may include an interior end 124 and an exterior end 126, the exterior end 126 opening at a front edge 128 of the adjustment plate 110, whereas the slot 118 is disposed inwardly from the front edge 128. The interior end 124 is lower than the exterior end 126 to give the cutout 122 a diagonal configuration. As described further below, the cutout 122 is configured to receive a second fastener 130 for assembly and installation of the bracket assembly 100 and loudspeaker 102.

Figure 1:
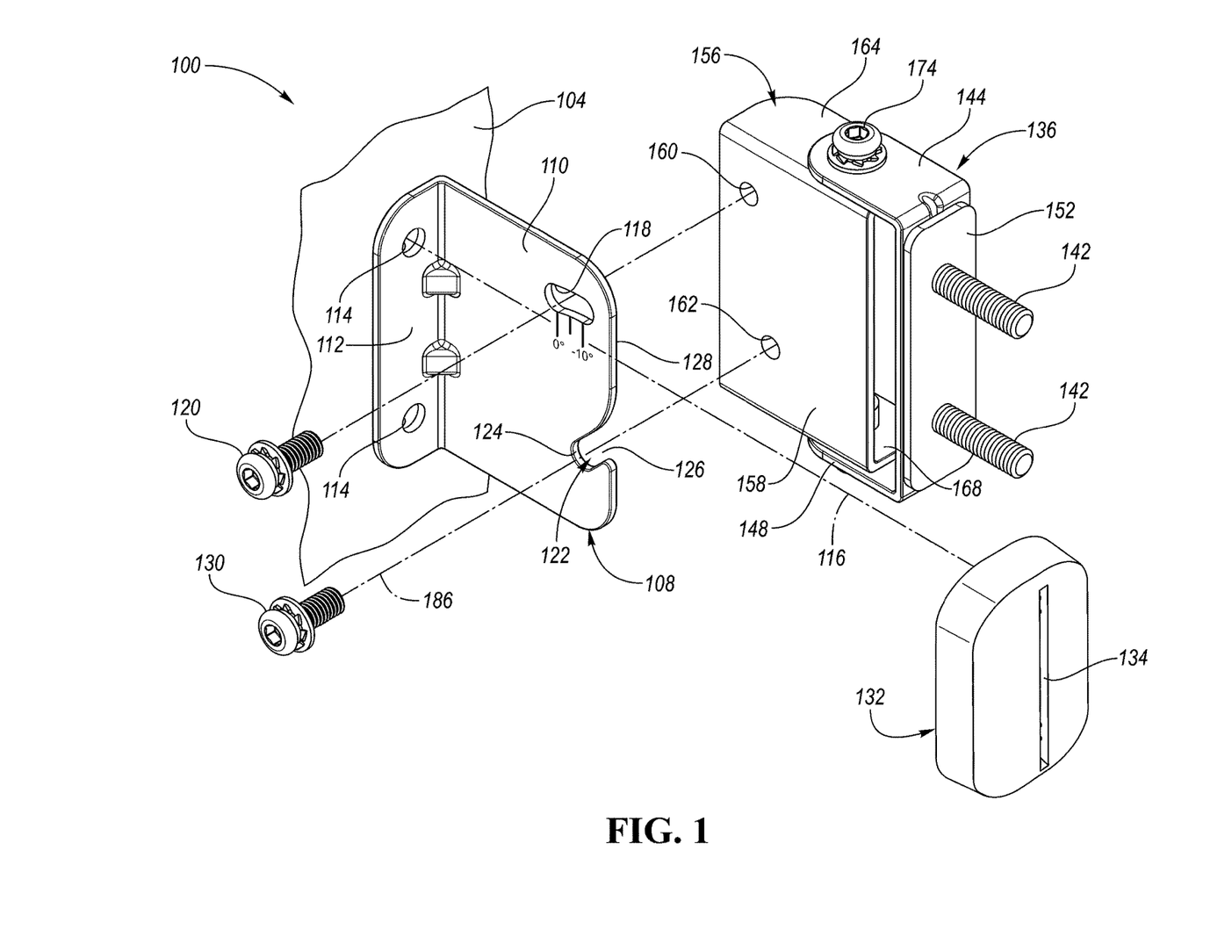
FIG. 1 is a perspective, partially exploded view of a bracket assembly including a cover according to one or more embodiments.
Figure 10:
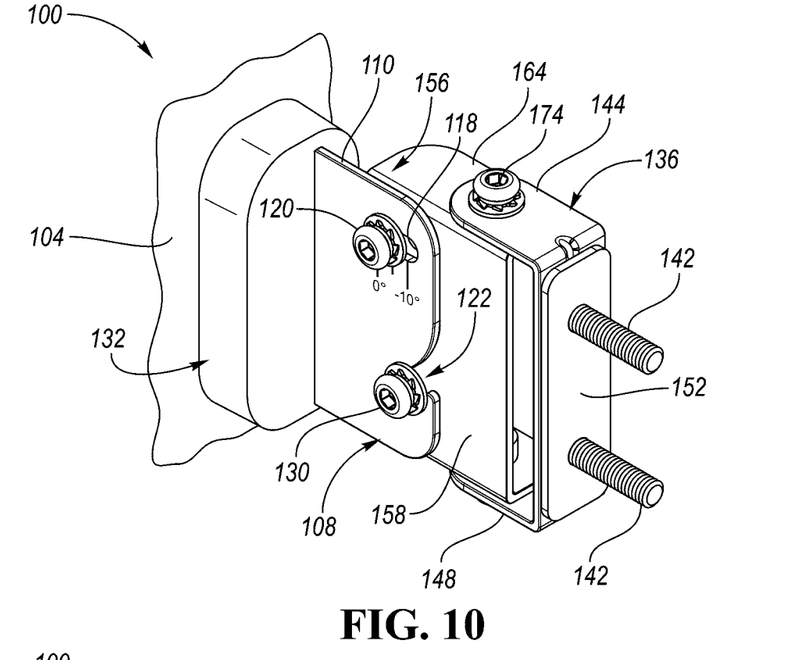
FIG. 10 is a perspective view of the bracket assembly set with a 0° tilt angle.
Figure 11:
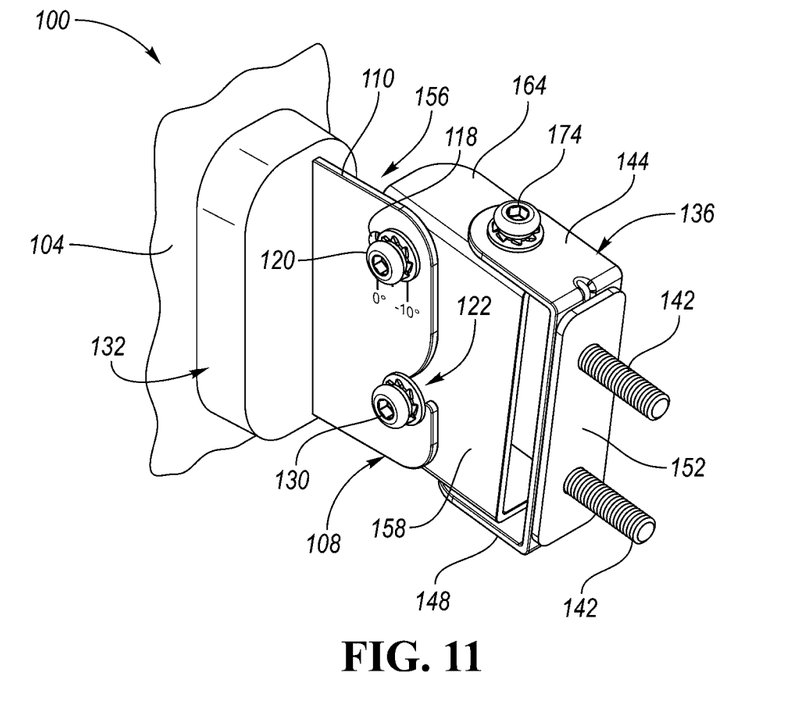
FIG. 11 is a perspective view of the bracket assembly set with a −10° tilt angle.

When the wall bracket 108 is mounted to the support surface 104, the fasteners (e.g. screws; not shown) received through the apertures 114 used are exposed. As such, in one or more embodiments, a cover 132 may be provided for placement over the wall bracket 108, which may give the bracket assembly 100 a more finished outward appearance. As illustrated in FIG. 1, the cover 132 may have a generally rectangular dome shape and include a longitudinal slot 134 configured to receive the adjustment plate 110 of the wall bracket 108 therethrough. The cover 132 may be installed such that it rests against the support surface 104, and may have a length and width sufficient to overlie and conceal the entire mounting flange 112 of the wall bracket 108 when installed, as shown in FIGS. 10-11. In one or more embodiments, the cover 132 does not require any fasteners, but simply can remain secured over the mounting flange 112 via an interference fit between the adjustment plate 110 and the longitudinal slot 134.

Figure 12:
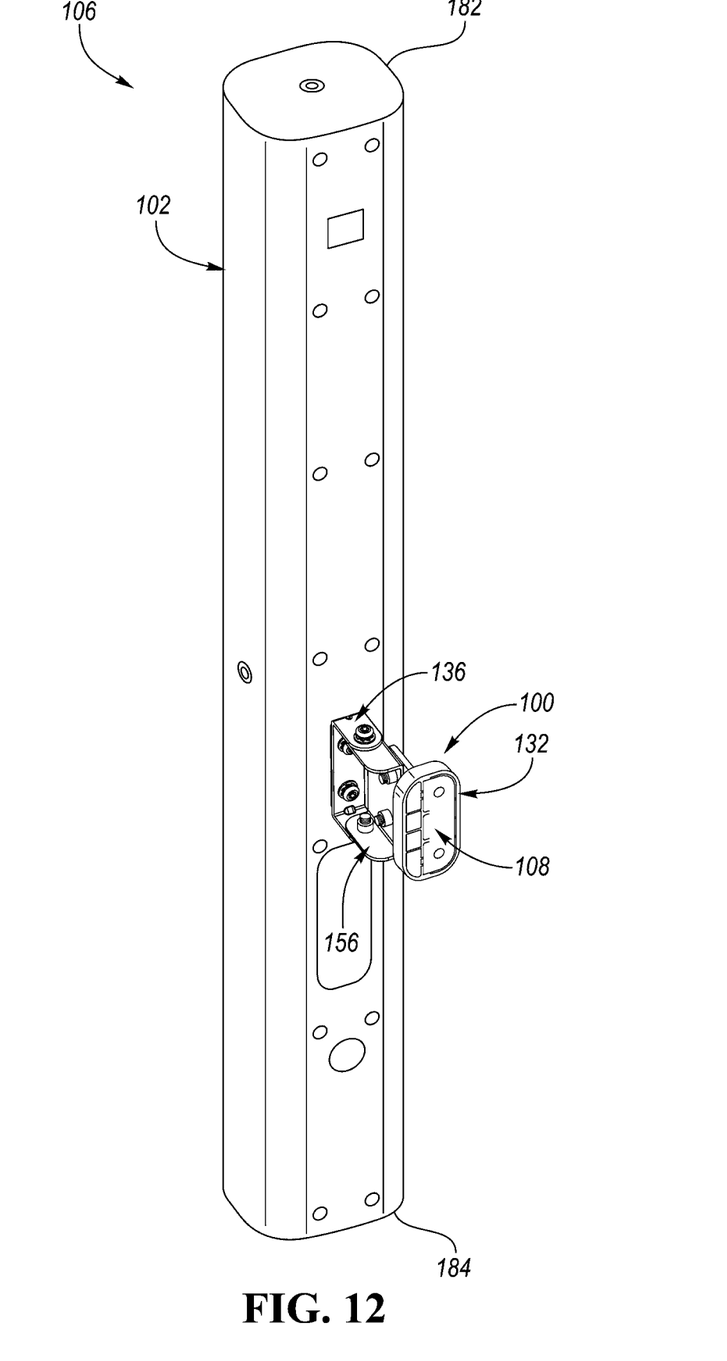
FIG. 12 is a perspective view of the bracket assembly with a loudspeaker mounted thereto at 0° tilt angle according to one or more embodiments.
Figure 13:
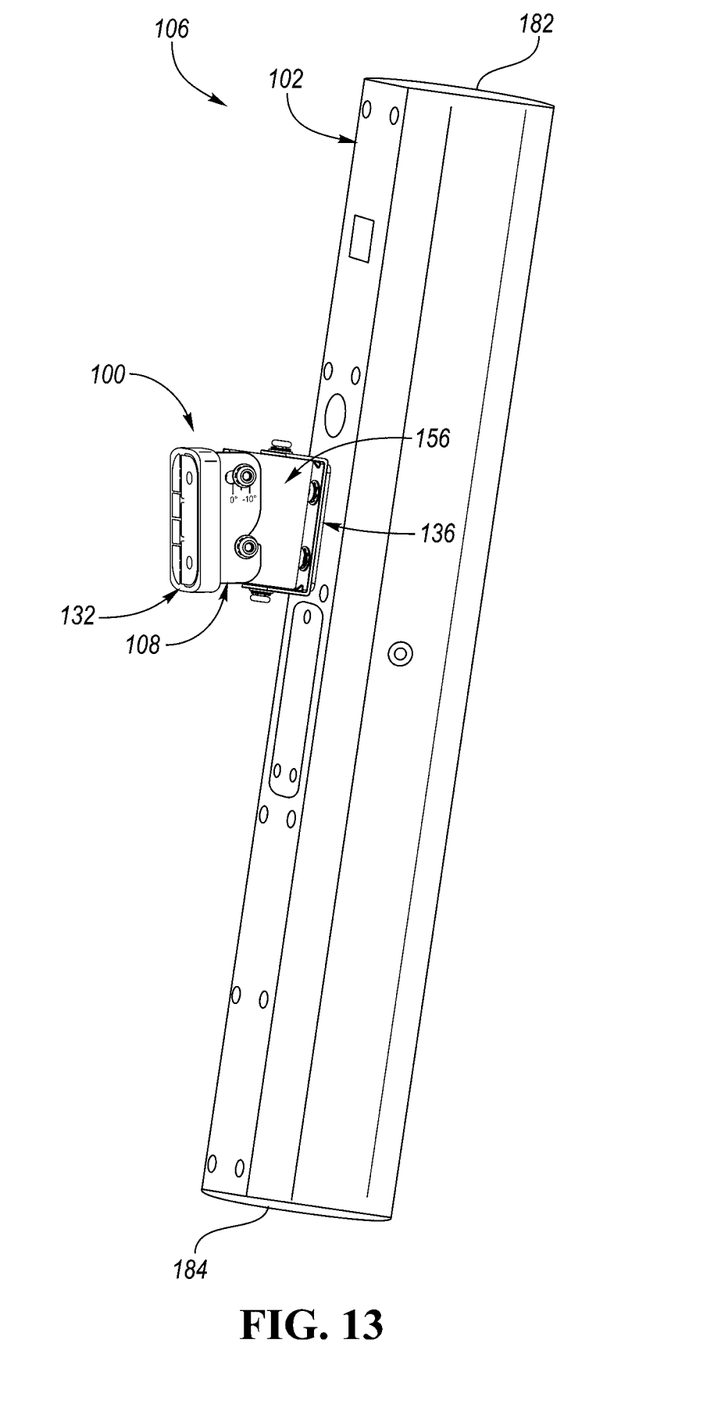
FIG. 13 is a perspective view of the bracket assembly with a loudspeaker mounted thereto at a −10° tilt angle according to one or more embodiments.

The bracket assembly 100 also includes a speaker bracket 136 including a central plate 138 mountable to the loudspeaker 102, as best shown in FIGS. 1-5 and 8-12. The central plate 138 has at least one aperture 140 (e.g. two spaced apertures 140) each configured to receive a fastener 142 for mounting the speaker bracket 136 to the loudspeaker 102, such as to the loudspeaker housing. The speaker bracket 136 includes a top arm 144 generally orthogonal to the central plate 138 and having a top aperture 146, and a bottom arm 148 generally orthogonal to the central plate 138 and having a bottom aperture 150. As such, the speaker bracket 136 may have a generally U-shaped or C-shaped appearance. The loudspeaker 102 may be long and cylindrical as shown in FIGS. 12-13, but is not limited to this configuration. As such, the bracket assembly 100 described herein is not limited to use with any particular type of loudspeaker 102 or transducer. In addition, the speaker bracket 136 may be attached to the loudspeaker 102 at any position, and is not limited to the exemplary positions shown herein.

In one or more embodiments, the bracket assembly 100 may further include a pad 152 (best shown in FIGS. 10-11) configured to be received on an outer face 154 of the central plate 138 of the speaker bracket 136, wherein the pad 152 is arranged to be disposed between the speaker bracket 136 and the loudspeaker 102. The pad 152 may have a generally rectangular shape sized to correspond to a shape of the central plate 138, and may have apertures 155 configured to align with the apertures 140 of the central plate 138. The pad 152 may be constructed from a rubber material, for example, and may enhance stability of the mounted loudspeaker 102 and prevent accidental scratches on the loudspeaker 102 from the speaker bracket 136.

Figure 2:
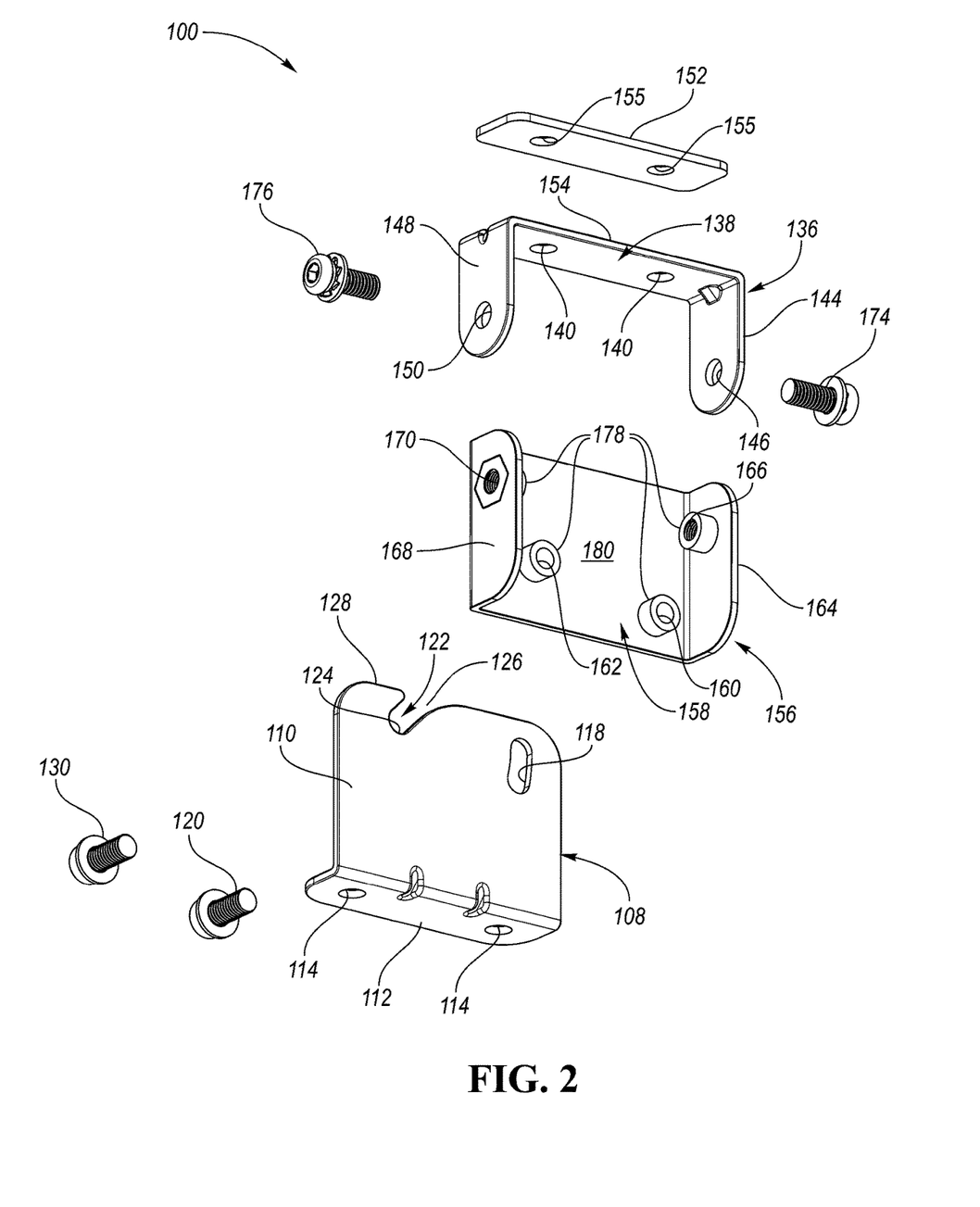
FIG. 2 is a perspective, exploded view of the bracket assembly.
Figure 3:
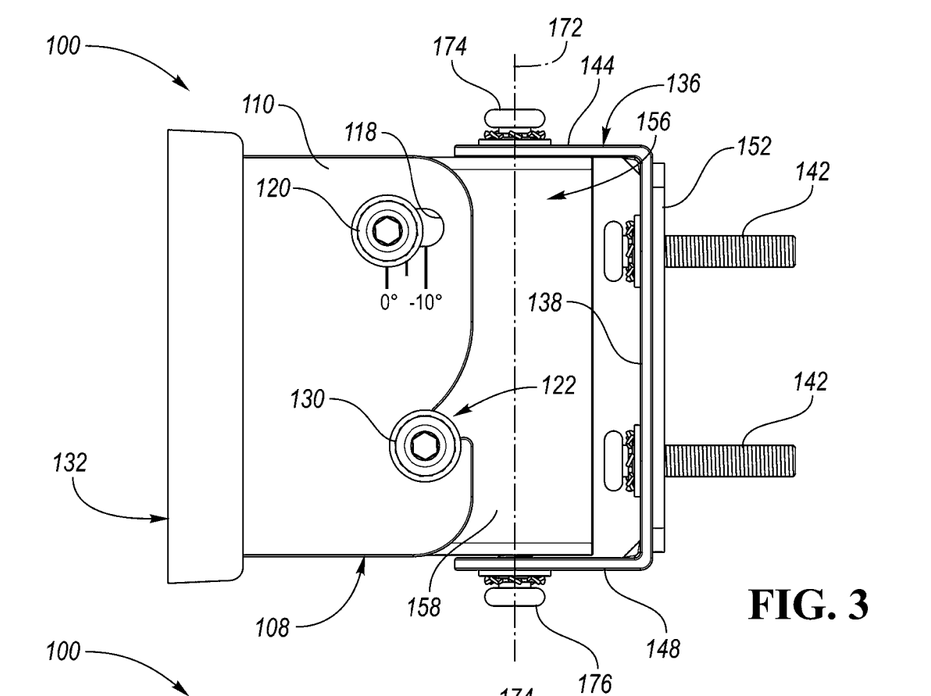
FIG. 3 is a right side view of the bracket assembly set with a 0° tilt angle.
Figure 4:
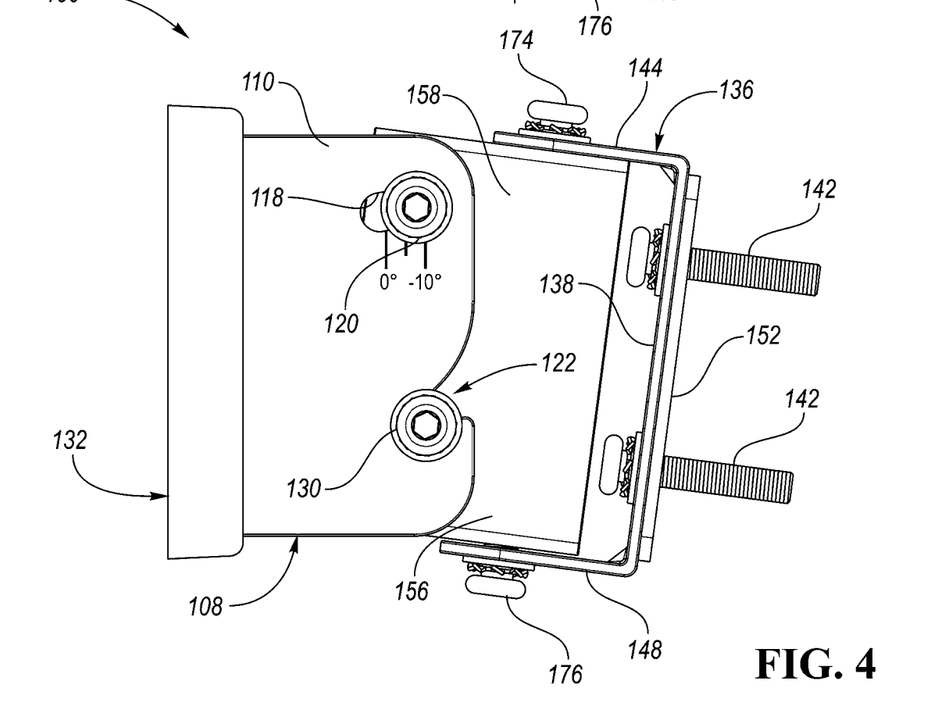
FIG. 4 is a right side view of the bracket assembly set with a −10° tilt angle.
Figure 5:
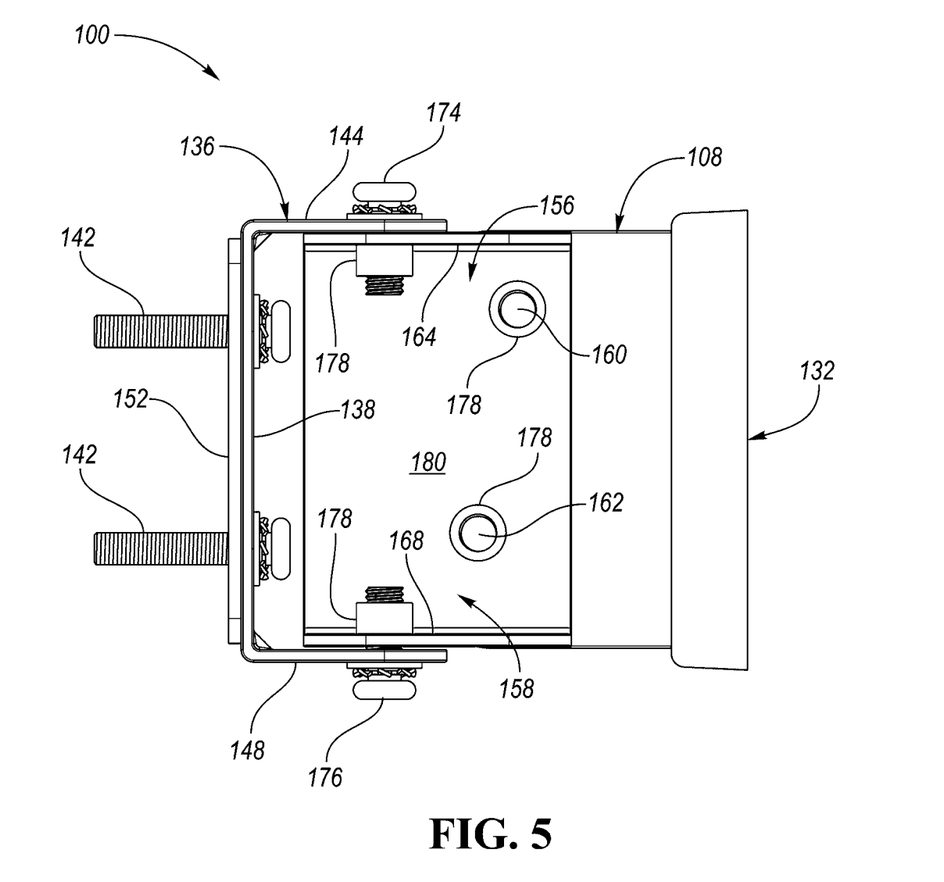
FIG. 5 is a left side view of the bracket assembly.
Figure 6:
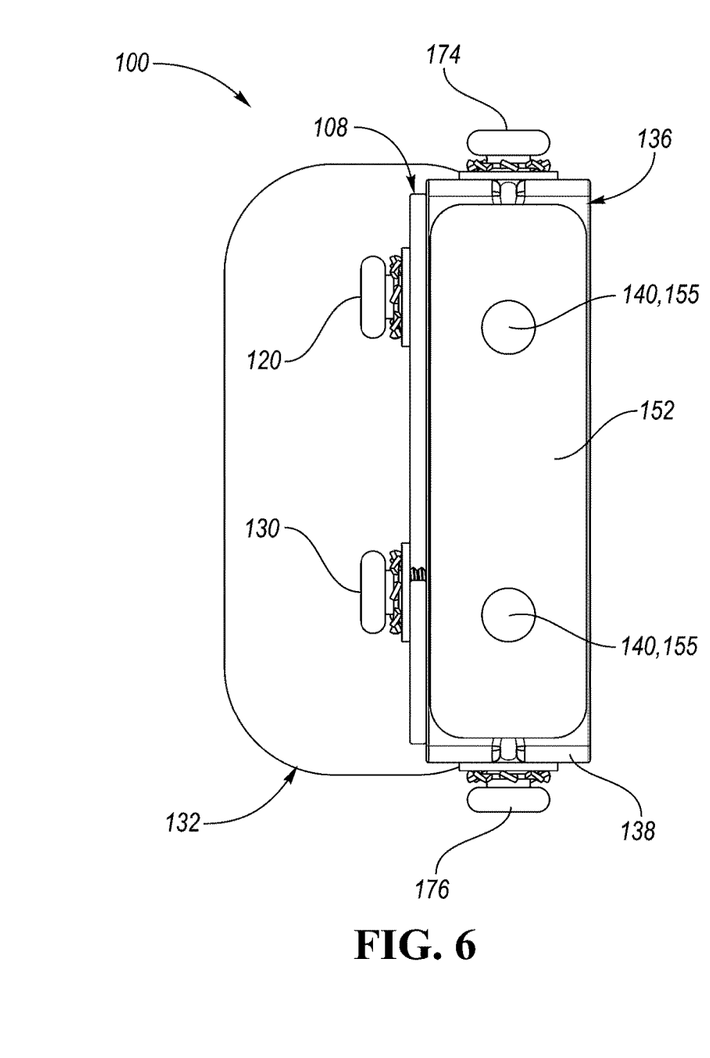
FIG. 6 is a front view of the bracket assembly.
Figure 7:
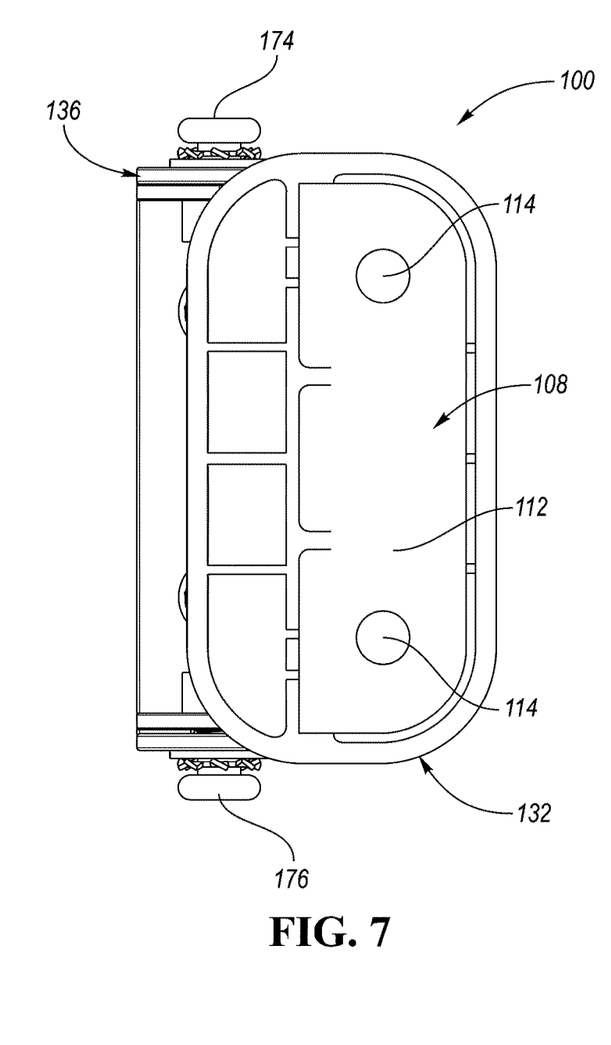
FIG. 7 is a rear view of the bracket assembly.
Figure 8:
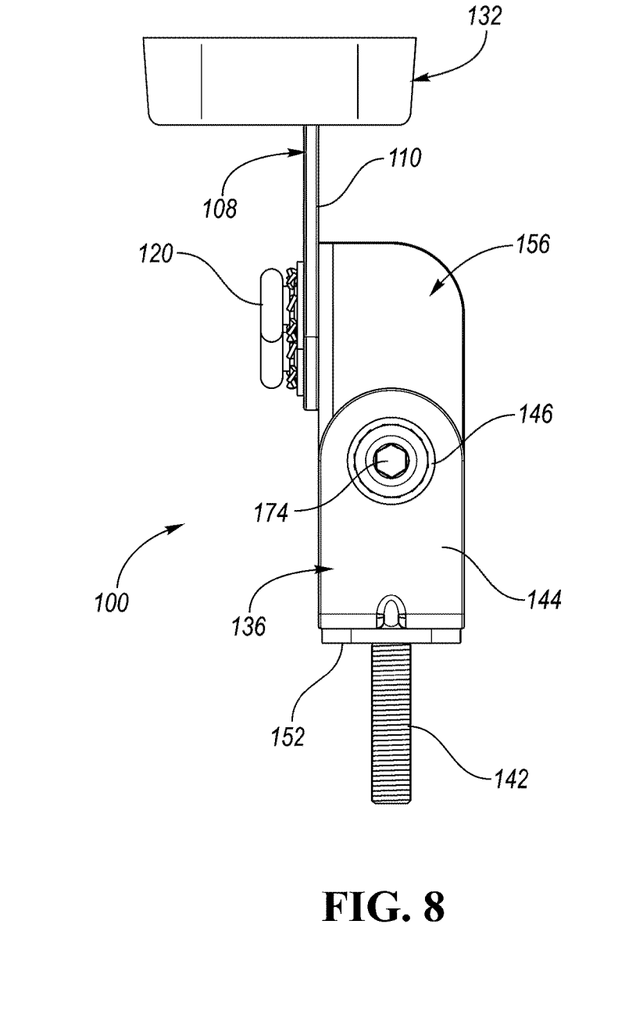
FIG. 8 is a top view of the bracket assembly.
Figure 9:
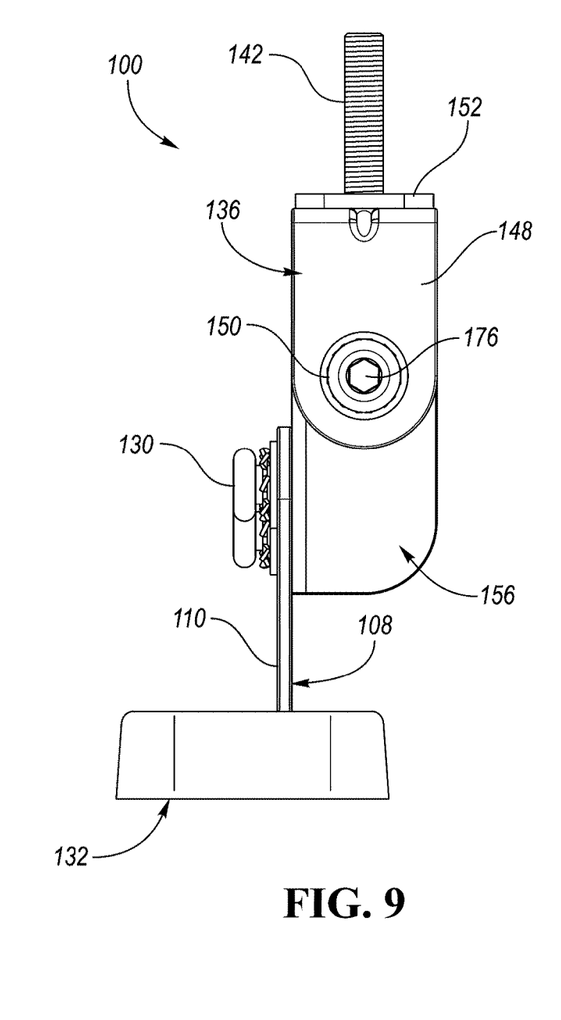
FIG. 9 is a bottom view of the bracket assembly.

With reference to FIGS. 1-2, the bracket assembly 100 further includes an intermediate bracket 156 having a joining plate 158 including a first aperture 160 and a second aperture 162, wherein the second aperture 162 is below the first aperture 160, and the second aperture 162 may be offset longitudinally from the first aperture 160 further toward a central region of the intermediate bracket 156. The intermediate bracket 156 further includes an upper flange 164 generally orthogonal to the joining plate 158 and including an upper aperture 166, and a lower flange 168 generally orthogonal to the joining plate 158 and including a lower aperture 170. As such, the intermediate bracket 156 may have a generally U-shaped or C-shaped appearance.

In one or more embodiments, a height of the speaker bracket 136 may be greater than a height of the intermediate bracket 156, such that the intermediate bracket 156 is received within the speaker bracket 136 with the top arm 144 overlying the upper flange 164 and the bottom arm 148 overlying the lower flange 168 (see, for example, FIGS. 1, 3-5, and 10-11). Of course, it is contemplated that the reverse configuration is also possible, with the height of the intermediate bracket 156 greater than the height of the speaker bracket 136 and the speaker bracket 136 received within the intermediate bracket 156 with the upper flange 164 overlying the top arm 144 and the lower flange 168 overlying the bottom arm 148.

In one or more embodiments, the intermediate bracket 156 may be coupled or couplable to the speaker bracket 136 and rotatable about a vertical axis 172 (FIG. 3) defined between the top arm 144 and the bottom arm 148, such as between the top aperture 146 and the bottom aperture 150. As best shown in FIGS. 3-7, a top fastener 174 is configured to be received through the top aperture 146 and the upper aperture 166, and a bottom fastener 176 is configured to be received through the bottom aperture 150 and the lower aperture 170. Via this rotatable coupling, the relative position between the intermediate bracket 156 and the speaker bracket 136 can be adjusted to provide pan adjustability of the loudspeaker 102. Adjusting (i.e. loosening and tightening) of the top fastener 174 and the bottom fastener 176 provides the capability for pan angle adjustability of the loudspeaker 102 with respect to the intermediate bracket 156 and the support surface 104, and allows the pan position of the loudspeaker 102 to be fixed with respect to the intermediate bracket 156 and the support surface 104. In one example, the pan angle of the loudspeaker 102 may range between approximately −90° and 900 (adjacent to the support surface 104 on either side of the wall bracket 108), with 0° representing a plane generally orthogonal to the support surface 104.

As shown in FIGS. 3-4 and 10-11, the wall bracket 108 is connectable to the intermediate bracket 156 (and thus to the attached speaker bracket 136 and loudspeaker 102) via the first fastener 120 received through the slot 118 and the first aperture 160, and via the second fastener 130 received through the cutout 122 and the second aperture 162. The wall bracket 108 may be securely fastened to the support surface 104, optionally with the cover 132 positioned to conceal the mounting flange 112, prior to connecting the wall bracket 108 to the intermediate bracket 156. In one or more embodiments, the intermediate bracket 156 includes fixed screw bolts 178 (see FIGS. 2 and 5) formed in a rear surface 180 thereof and aligned with the upper aperture 166, the lower aperture 170, the first aperture 160, and the second aperture 162 for receiving the top fastener 174, the bottom fastener 176, the first fastener 120, and the second fastener 130, respectively. The fixed screw bolts 178 advantageously enable one-handed assembly and adjustment of the bracket assembly 100 by the user, leaving the other hand free, such as to support the loudspeaker 102. Accordingly, only a single person is required to complete installation of the bracket assembly 100 and attached loudspeaker 102.

With reference to FIGS. 3-4 and 10-13, a position of the first fastener 120 is movable along the slot 118, such that the wall bracket 108 is movably coupled to the intermediate bracket 156 for providing tilt adjustability of the loudspeaker 102, such as with respect to the support surface 104. The slot 118 permits a range of tilt angles of the mounted loudspeaker 102 between an on-axis position and a maximum off-axis position. In one or more embodiments, a length of the slot 118 determines the range of tilt adjustability of the loudspeaker 102, such as between an angle of about 0° (loudspeaker 102 in a plane generally parallel to the support surface 104) to an angle of about −10° (loudspeaker 102 tilted downward with a top end 182 spaced farther from the support surface 104 compared with a bottom end 184), wherein this range may be appropriate for optimal acoustic performance of the loudspeaker 102. However, the disclosed range is not intended to be limiting, and other tilt angle ranges are also contemplated. In one or more embodiments, the slot 118 may be configured to allow an essentially infinite number of tilt angles to be selected between the on-axis position and the maximum off-axis position. Alternatively, the slot 118 or another tilt angle mechanism could be structured to allow a finite number of tilt angles to be selected (i.e., via incremental adjustment).

Engagement of the second fastener 130 through the cutout 122 and the second aperture 162 will retain the connection between the wall bracket 108 and the intermediate bracket 156 and support the loudspeaker 102 while the tilt angle of the loudspeaker 102 is being selected or adjusted by movement of the first fastener 120 along the slot 118. As a position of the first fastener 120 is moved along the slot 118, the intermediate bracket 156 (and attached speaker bracket 136 and loudspeaker 102) will rotate about the second fastener 130 and a transverse axis 186 (FIG. 1). When the desired tilt angle is reached, both the first fastener 120 and the second fastener 130 can be tightened to secure the wall bracket 108 to the intermediate bracket 156, and thus fix the entire bracket assembly 100 at the desired tilt angle of the loudspeaker 102.

Advantageously, once the user has mounted the loudspeaker 102 to the support surface 104 using the bracket assembly 100, there is no need to disassemble the entire bracket assembly 100 to adjust the tilt and/or pan angles of the loudspeaker 102. The first fastener 120 and the second fastener 130 can be adjusted (i.e. loosened and tightened) to adjust the tilt angle of the loudspeaker 102, and the top fastener 174 and the bottom fastener 176 can be adjusted (i.e. loosened and tightened) to adjust the pan angle of the loudspeaker 102, all while the bracket assembly 100 is mounted to the support surface 104 and to the loudspeaker 102. Furthermore, adjustment of each of the first fastener 120, the second fastener 130, the top fastener 174, and the bottom fastener 176 can be accomplished with one-handed operation by the user, since each of these fasteners 120, 130, 174, 176 is received in a corresponding fixed screw bolt 178 on the intermediate bracket 156.

In one or more embodiments, it is contemplated that the intermediate bracket 156 and the speaker bracket 136 may be coupled together or pre-assembled, with the wall bracket 108 separate. However, it is understood that any of the wall bracket 108, the intermediate bracket 156, and the speaker bracket 136 may be pre-assembled or may initially be separate components that are later coupled together.

It is understood that the use herein of relative and directional terms such as front, outer, rear, inner, upper, lower, top, bottom, horizontal, vertical, and other such terms is not intended to limit the bracket assembly 100, the loudspeaker 102, or any of their respective components and features to any particular orientation in space. Furthermore, while the bracket assembly 100 is shown and described herein as being specific to inserting fasteners into the wall bracket 108 from a left side, it is understood that the bracket assembly 100 is not limited to this configuration, and that a corresponding right side bracket assembly 100 could be provided which is a mirror image thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bracket assembly for mounting a loudspeaker to a support surface, the bracket assembly comprising:
   a generally L-shaped wall bracket including an adjustment plate and a mounting flange, the mounting flange mountable to the support surface, the adjustment plate including a slot;
   a generally U-shaped speaker bracket including a central plate mountable to the loudspeaker, a top arm extending from the central plate, and a bottom arm extending from the central plate; and
   a generally U-shaped intermediate bracket having a joining plate including a first aperture, an upper flange extending from the joining plate, and a lower flange extending from the joining plate,
   wherein the intermediate bracket is coupled to the speaker bracket and rotatable about an axis defined between the top arm and the bottom arm for providing pan adjustability of the loudspeaker, and the wall bracket is connectable to the intermediate bracket via a first fastener received through the slot and the first aperture, wherein a position of the first fastener is movable along the slot for providing tilt adjustability of the loudspeaker.

2. The bracket assembly of claim 1, wherein the first fastener is configured to fix a tilt position of the loudspeaker.

3. The bracket assembly of claim 1, wherein the slot is oriented generally parallel to a horizontal axis of the wall bracket.

4. The bracket assembly of claim 1, wherein a length of the slot corresponds to the tilt adjustability of the loudspeaker ranging between tilt angles of about 0° to −10°.

5. The bracket assembly of claim 1, wherein the wall bracket further comprises a cutout disposed below the slot, and the intermediate bracket includes a second aperture below the first aperture, wherein the cutout and the second aperture are configured to receive a second fastener to support the loudspeaker during adjustment of the position of the first fastener along the slot.

6. The bracket assembly of claim 1, wherein the top arm includes a top aperture, the bottom arm includes a bottom aperture, the upper flange includes an upper aperture, and the lower flange includes a lower aperture, and wherein a top fastener is configured to be received through the top aperture and the upper aperture, and a bottom fastener is configured to be received through the bottom aperture and the lower aperture, the top fastener and bottom fastener configured to fix a pan position of the loudspeaker.

7. The bracket assembly of claim 6, wherein the intermediate bracket includes fixed screw bolts formed in a rear surface thereof and aligned with the upper aperture, the lower aperture, and the first aperture for receiving the top fastener, the bottom fastener, and the first fastener, respectively.

8. The bracket assembly of claim 1, further comprising a cover having a longitudinal slot, the longitudinal slot configured to receive the adjustment plate of the wall bracket, the cover configured to conceal the mounting flange of the wall bracket.

9. A bracket assembly for mounting a loudspeaker to a support surface, the bracket assembly comprising:
   a wall bracket including an adjustment plate and a mounting flange generally orthogonal to the adjustment plate, the mounting flange including at least one aperture configured to receive a fastener for mounting the wall bracket to the support surface, the adjustment plate having a horizontal axis and including a slot oriented generally parallel to the horizontal axis, the adjustment plate including a cutout oriented diagonally with respect to the horizontal axis;
   a speaker bracket including a central plate having at least one aperture configured to receive a fastener for mounting the speaker bracket to the loudspeaker, a top arm generally orthogonal to the central plate and having a top aperture, and a bottom arm generally orthogonal to the central plate and having a bottom aperture; and an intermediate bracket having a joining plate including a first aperture and a second aperture, an upper flange generally orthogonal to the joining plate and including an upper aperture, and a lower flange generally orthogonal to the joining plate and including a lower aperture, wherein the intermediate bracket is coupled to the speaker bracket and rotatable about an axis defined between the top aperture and the bottom aperture for providing pan adjustability of the loudspeaker, and the wall bracket is connectable to the intermediate bracket via a first fastener received through the slot and the first aperture and via a second fastener received through the cutout and the second aperture, wherein a position of the first fastener is movable along the slot for providing tilt adjustability of the loudspeaker.

10. The bracket assembly of claim 9, wherein the first fastener is configured to fix a tilt position of the loudspeaker.

11. The bracket assembly of claim 9, wherein a length of the slot corresponds to the tilt adjustability of the loudspeaker ranging between tilt angles of about 0° to −10°.

12. The bracket assembly of claim 9, wherein the second fastener is configured to support the loudspeaker during adjustment of the position of the first fastener along the slot.

13. The bracket assembly of claim 9, wherein a top fastener is configured to be received through the top aperture and the upper aperture, and a bottom fastener is configured to be received through the bottom aperture and the lower aperture, the top fastener and bottom fastener configured to fix a pan position of the loudspeaker.

14. The bracket assembly of claim 13, wherein the intermediate bracket includes fixed screw bolts formed in a rear surface thereof and aligned with the upper aperture, the lower aperture, the first aperture, and the second aperture for receiving the top fastener, the bottom fastener, the first fastener, and the second fastener, respectively.

15. The bracket assembly of claim 9, further comprising a cover having a longitudinal slot, the longitudinal slot configured to receive the adjustment plate of the wall bracket, the cover configured to conceal the mounting flange of the wall bracket.

16. A method for mounting a loudspeaker to a support surface, the method comprising:

providing a generally L-shaped wall bracket including an adjustment plate and a mounting flange, the adjustment plate including a slot;

providing a generally U-shaped speaker bracket including a central plate, a top arm, and a bottom arm;

providing a generally U-shaped intermediate bracket having a joining plate including a first aperture, an upper flange, and a lower flange, the intermediate bracket rotatably coupled to the speaker bracket;

mounting the mounting flange of the wall bracket to the support surface;

mounting the central plate of the speaker bracket to the loudspeaker;

receiving a first fastener through the slot of the wall bracket and the first aperture of the intermediate bracket to connect the wall bracket to the intermediate bracket;

adjusting a relative position between the intermediate bracket and the speaker bracket to provide pan adjustability of the loudspeaker; and adjusting a position of the first fastener along the slot to provide tilt adjustability of the loudspeaker.

17. The method of claim 16, securing the first fastener in the slot to fix a tilt position of the loudspeaker.

18. The method claim 16, wherein the wall bracket further comprises a cutout disposed below the slot, and the intermediate bracket includes a second aperture below the first aperture, the method further comprising receiving a second fastener through the cutout and the second aperture to support the loudspeaker during adjustment of the position of the first fastener along the slot.

19. The method of claim 16, wherein the top arm includes a top aperture, the bottom arm includes a bottom aperture, the upper flange includes an upper aperture, and the lower flange includes a lower aperture, the method further comprising receiving a top fastener through the top aperture and the upper aperture, receiving a bottom fastener through the bottom aperture and the lower aperture, and securing the top fastener and the bottom fastener to fix a pan position of the loudspeaker.

20. The method of claim 16, further comprising providing a cover having a longitudinal slot, receiving the adjustment plate of the wall bracket through the longitudinal slot, and concealing the mounting flange of the wall bracket with the cover.

* * * * *